May 5, 1925.  1,536,870

A. KLOTZ

VALVE FOR INFLATED ARTICLES

Original Filed June 5, 1922

Inventor:-
Alfred Klotz
by [signature]
his attorney

Patented May 5, 1925.

1,536,870

UNITED STATES PATENT OFFICE.

ALFRED KLOTZ, OF MUNICH, GERMANY.

VALVE FOR INFLATED ARTICLES.

Original application filed June 5, 1922, Serial No. 566,027. Divided and this application filed April 11, 1923. Serial No. 631,308.

*To all whom it may concern:*

Be it known that I, ALFRED KLOTZ, a citizen of the German Reich, residing at Munich, Germany, have invented certain new and useful Improvements in Valves for Inflated Articles, of which the following is a specification.

Original application filed June 5, 1922, of which this application is a division.

This invention relates to an inlet valve for bodies to be inflated, for instance pneumatic insertions for shoes, footballs or the like.

The invention has for its object to create an absolutely flat valve which is required for instance for the inflating of pneumatic insertions for shoes for flat-footed people, hernial trusses or bandages, football bladders or the like. With valves designed for these purposes every element which increases the thickness of the valve is very inconvenient owing to the lack of space, so that resiliency of the non-return valve is abandoned, this valve being located in the air pumps. In the arrangements of known type the nut which serves for closing the valve projects from the same and has to be tightened by hand before the pump is removed. According to this invention this nut projecting from the valve is no longer required.

The invention consists in using a closing nut for the orifice of the valve having in its outer surface a conical smooth walled cavity into which the conical mouth piece of the air pump fits air-tightly. The conical tubular mouth piece is adapted to serve at the same time as driver for the screwing-on and off of the nut. The outer edge of the conical cavity in the locking nut has either a circular groove or rib of polygonal shape or it has two diametrically opposed radially directed indentations or projections so that the conical mouth piece of the air pump which has on its base projections or indentations corresponding with the indentations or projections of the locking nut can draw the same along much more securely if it is inserted into the locking nut.

On the accompanying drawing a form of construction of the improved air valve and several forms of construction of the mouth piece of the air pump are shown by way of example.

Figure 1:
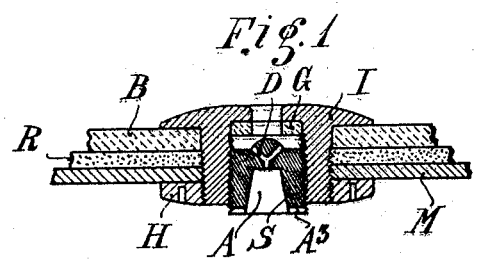
Fig. 1 shows the air valve in cross section.
Figure 2:
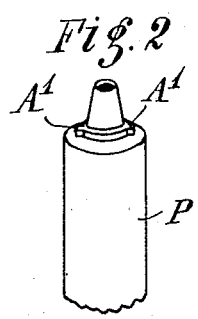
Figure 3:
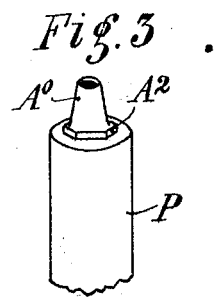

The air pump P serves at the same time as screw driver and with this object in view the mouth piece of the air pump is cone-shaped as shown in Figs. 1–3 and corresponds with the shape A of the cavity S (Fig. 1) of the valve. On the base of the conical mouth piece of the pump rings or projections are arranged which are designed to engage with corresponding cavities of the locking nut. In Fig. 2 two radially directed noses A' are arranged in the conical mouth piece extending diametrically opposite to one another. Fig. 3 shows a polygonal ring A² on the conical mouth piece. In order to preserve the good fit the projections A' do not reach down completely to the bottom of the indentation A.

The valve shown in Fig. 1 consists of a body I which is pressed by means of a nut H against the wall B of the bladder and against the metal support M and on a washer R. This metal support M is required if the valve is to be used for pneumatic insertions for shoes or for hernial bandages. In the upper end of the valve body I a packing disk G is inserted. The nut S has indentations A³ (as shown in Fig. 1) into which fit the two noses or projections A' of the pump (Fig. 2). In order to inflate the bladder the conical mouth piece of the pump is pressed into the corresponding conical bore of the nut whereby the noses A' engage with the cavities A, so that a practically air-tight closure is produced. The air passage D is then uncovered (at right hand thread) by a slight rotation of the pump P to the left and the air is pumped into the bladder.

Figure 4:
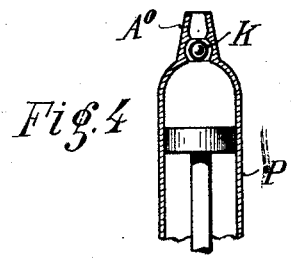
Figs. 2, 3 and 4 show several forms of the mouth piece of the air pump.

The outflow of the air from the bladder, if the mouth piece of the pump is removed, is prevented by a ball (Fig. 4) or other convenient means K. After the bladder has been sufficiently inflated the locking nut is screwed home by a slight rotation of the pump in right hand side direction.

Experience has shown that in many cases the mere friction of the conical mouth piece A⁰ in the conical bore of the nut S is sufficient to unscrew the nut S or to tighten the same. By omitting the noses A' and the corresponding indentations A³ or by omitting likewise the polygonal ring A² at the mouth piece of the air pump, a special advantage is obtained in so far as the threads of the valve plug A can never be stripped, even if the device is carelessly or roughly manipulated by inexperienced people. After the valve A plug has become properly seated, the frictional contact is automatically broken and continued rotary thrust however violent can do no damage to the flat threaded valve which by reason of its very flatness would otherwise be liable to thread stripping.

This improved arrangement permits not only that the valve is made quite flat but also to facilitate the manipulation at the inflating. With valves of the commonly used construction this manipulation is complicated as the pump has to be held with one hand, the other hand being used for tightening the locking screw and for holding the cushion to be inflated.

A further important advantage of the improved construction is that the air filling of the cushion can be accurately regulated which is specially necessary if the air volume of the cushion is only small as is the case with the insertions in shoes for flat-footed people and with hernic bandages. With the air pumps and walls commonly used construction some time is lost by the tightening of the locking screw by hand so that air must escape through the threads. With this improved air valve according to the invention this inconvenience is avoided as after the pumping or during the same the valve can be instantaneously closed by a slight rotation of the pump.

I claim :—

In a valve of the type set forth, in combination with a rotatable tool presenting a conically tapered end, a valve case, a valve plug rotatable therein and presenting a concentric tapering depression of a taper complemental to that of said tool end for frictional cooperation therewith, the friction angle between said complemental taper surfaces being such that upon the plug becoming properly seated, the frictional cooperation between plug and tool is automatically broken.

In testimony whereof I affix my signature in presence of two witnesses.

ALFRED KLOTZ.

Witnesses:
 ANNA BRANDMAIER,
 FRANZ TRAUTMANN.